United States Patent [19]

Sullivan

[11] Patent Number: 4,470,520
[45] Date of Patent: Sep. 11, 1984

[54] STORAGE AND DISPENSING OF BLOOD GAS QUALITY CONTROL REAGENT FROM A PRESSURIZED CONTAINER

[75] Inventor: Kevin J. Sullivan, Painted Post, N.Y.
[73] Assignee: Corning Glass Works, Corning, N.Y.
[21] Appl. No.: 476,209
[22] Filed: Mar. 17, 1983

Related U.S. Application Data

[60] Continuation of Ser. No. 177,211, Aug. 11, 1980, abandoned, which is a division of Ser. No. 3,072, Jan. 12, 1979, Pat. No. 4,266,941.

[51] Int. Cl.³ .......................... B65D 35/22; A61J 1/00
[52] U.S. Cl. ........................................ 222/94; 604/403
[58] Field of Search ........................... 222/94, 95, 189; 53/486, 489; 604/403, 406, 407, 408, 410

[56] References Cited

U.S. PATENT DOCUMENTS

| | | | |
|---|---|---|---|
| 2,815,889 | 12/1957 | Stetz et al. | 222/189 |
| 3,098,589 | 7/1963 | Graham | 222/189 X |
| 3,670,926 | 6/1972 | Hill | 222/95 X |
| 3,837,533 | 9/1974 | Splan | 222/94 |
| 3,979,025 | 9/1976 | Friedrich et al. | 222/95 |
| 4,266,941 | 5/1981 | Sullivan | 222/94 X |
| 4,375,743 | 3/1983 | Sullivan | 53/434 |

Primary Examiner—Robert B. Reeves
Assistant Examiner—Edward M. Wacyra
Attorney, Agent, or Firm—W. S. Zebrowski; D. M. Heist

[57] ABSTRACT

Disclosed is an apparatus for storing blood gas quality control reagent comprising a first variable volume, gas impermeable container for receiving the reagent. The reagent is stored exclusively in the liquid phase therein. A valved exit passageway emanates from the container which container is situated in a second container surrounding the first, a space being present therebetween and a compressed gas situated in the space. Upon opening the valve, the compressed gas decreases the volume of the first container and reagent is expelled through the exit passageway. The present device is uneffected by changes in ambient temperature since the reagent is stored exclusively in the liquid phase. The device is reusable since a portion of the reagent may be expelled without contamination of the remaining contents.

11 Claims, 8 Drawing Figures

STORAGE AND DISPENSING OF BLOOD GAS QUALITY CONTROL REAGENT FROM A PRESSURIZED CONTAINER

This is a continuation of application Ser. No. 177,211, filed Aug. 11, 1980, now abandoned, which is a division of application Ser. No. 003,072 filed Jan. 12, 1979, now U.S. Pat. No. 4,266,941.

Background Of The Invention

This invention relates in general to blood gas analyzers, and in particular, it relates to a device for and a method of assuring that the results obtained from a blood gas analyzer meet a quality control standard.

Blood gas analyzers are becoming increasingly important as analytical tools in medical laboratories. Blood gas analyzers typically measure the partial pressure of oxygen and carbon dioxide gases ($P_{O2}$ and $PCO_2$) found in blood samples. These measurements, along with a ph measurement of the blood sample, provide an accurate determination of the body's metabolism and thus provide a monitor of the patient's cardiopulmonary system.

Blood gas analyzers provide the attending physician with important information so long as the results obtained therefrom are accurate. However, the obtaining of accurate results may be extremely difficult with these devices since the gas content of the blood sample can be affected by atmospheric pressure and ambient temperature. Accordingly, the particular collection and analytical techniques employed by the laboratory must be precisely controlled. For example, blood samples retrieved from the patient must be isolated from the ambient and a constant temperature must be adequately maintained.

For a discussion of the clinical techniques employed to insure accurate blood gas analysis, see the article entitled "Reliable Blood Gas Analysis", Antonias L. van Kessel, American Society of Clinical Pathologists, Issue No. 20, 1975.

To insure that a blood gas analyzer is operating properly, it is usually frequently calibrated, at least on a daily basis. By calibration is meant a check and possible adjustment and readjustment of the blood gas analyzer to insure that the analyzer output accurately reflects the oxygen and carbon dioxide pressures of the sample at the measuring probe of the instrument. For a discussion of the calibration of blood gas analyzers, see the article entitled "Calibration of Blood Gas Analyzers" by Allen H. Runck, Proceedings of a Workshop on Ph and Blood Gases held at the National Bureau of Standards, Gaithersburg, Maryland, July 7 and 8, 1975, National Bureau of Standards, Special Publication No. 450.

However, even if a blood gas analyzer is properly calibrated, the results obtained therefrom, may not properly reflect the patient's condition. For example, if a batch of samples had been exposed to the ambient atmosphere, the blood gas analyzer may accurately determine the gas pressure of the sample, but this may not reflect the gas pressure of the patient's blood stream. Or, for example, sensor electrodes in the instrument may not be at the proper, i.e. body, temperature. Accordingly, a need exists, for not only calibrating blood gas analyzers, but also for subjecting the results of those analyzers to a quality control check. For discussion of the long felt need for quality control in blood gas analysis, see articles by Sorensen, Malenfant, Gambino and Noonan from the aforementioned Proceedings of a Workshop on ph and Blood Gases held at the National Bureau Standards, Gaithersburg, Maryland, July 7 and 8, 1975, National Bureau of Standards, Special Publication 450.

Of these articles the Sorensen and Malenfant articles indicate that tonometry is the preferred method of quality control in blood gas analysis due to its accuracy. However, tonometry is a relatively time consuming procedure, and, as pointed in the Noonan article, tedious and complicated quality control measures are ineffective since they are not utilized in busy laboratories. Accordingly, Noonan and Gambino recognize the desirability of what might be referred to as the ampoule or vial method of quality control in blood gas analysis.

In the ampoule or vial method of quality control, a sealed glass ampoule or vial is provided containing a reagent having a known quantity of gas dissolved therein. The reagent may, for example, be a buffered bicarbonate solution or whole blood. In any event, the contents of different vials are periodically inserted into the blood gas analyzer and the results are recorded. These results are compared against results obtained from earlier sampled standard vials. If the results obtained from a number of standard vials are consistently different from one another, it may be determined that a source of error has been introduced.

One problem which has been associated with the ampoule or vial method of quality control in blood gas analyzers has been that each ampoule or vial is capable of only a single use, for the reason that each time an ampoule or vial is opened, the contents thereof are exposed to the atmosphere and the partial pressure of the oxygen and carbon dioxide dissolved in the reagent contained therein begins to change. Because each ampoule or vial is capable of only a single use, the expense of packaging and employing these ampoules or vials is great.

Another problem associated with presently available ampoules is the fact that the reagent stored therein is found in both a liquid and a gas phase. At any particular temperature, the reagent in the ampoule will attain equilibrium between the liquid and gas phases. However, as the temperature of the vials change, the amount of gas dissolved in the reagent also changes. Therefore, before such vials are utilized, it is necessary to ensure that the vial is at a standard temperature. Many times this precaution is not taken in busy laboratories, thus reducing the effectiveness of a quality control effort.

It would be desirable to provide a device for and a method of calibrating a blood gas analyzer and for subjecting the results obtained from that blood gas analyzer to a quality control test which is both faster and more easily utilized than the aforementioned tonometry method and yet which is more economical than the ampoule method of quality control.

It would also be desirable to provide a device for and a method of quality control which would also be useful for calibration of blood gas analyzers.

Additionally, it would be desirable to provide a device for storing a reagent for use in the quality control of a blood gas analyzer which is unaffected by ambient temperature.

These objectives have been achieved in the present invention by the provision of a device for storing a liquid quality control reagent for use in a blood gas analyzer which comprises a first container of variable volume having a reagent contained therein which is exclusively in the liquid phase. An exit passageway is provided emanating from that container and a valve is situated in the passageway. The first container is situated in a second container and the space between the containers is filled with a compressed gas. Opening of the aforementioned valve allows for the release of the liquid quality control reagent either directly into the blood gas analyzer or into a syringe from which the reagent is then transferred into the blood gas analyzer.

Since the reagent is stored entirely in the liquid phase in the first container, the composition of the liquid reagent is unaffected by ambient temperature. Further, since the reagent is expelled by means of compressed gas which deforms the first container upon opening the valve, the device of the present invention is reusable in that the contents of the container are not exposed to the ambient. Accordingly, a number of quality control tests may be accomplished with a single filled device. Since the device is reusable, the expense of separately packaged vials is avoided and the possibility that the reagent concentration might vary from vial to vial is eliminated.

Also disclosed herein is a method of storing a liquid quality control reagent for use in the blood gas analyzer which comprises the steps of providing the aforementioned first container for receiving the liquid quality control reagent therein, the container having an input port projecting therefrom. Subsequently, the first container is overfilled with the reagent such that the liquid level in the container extends into the input port. The container is then sealed at the input port but below the liquid level and finally the container is externally pressurized. The employment of this method allows for the storing of liquid quality control reagent entirely in the liquid phase thereby preventing variation in the reagent parameters with temperature.

The present invention will be more fully understood by reference to the accompanying drawings in which.

Figure 1:
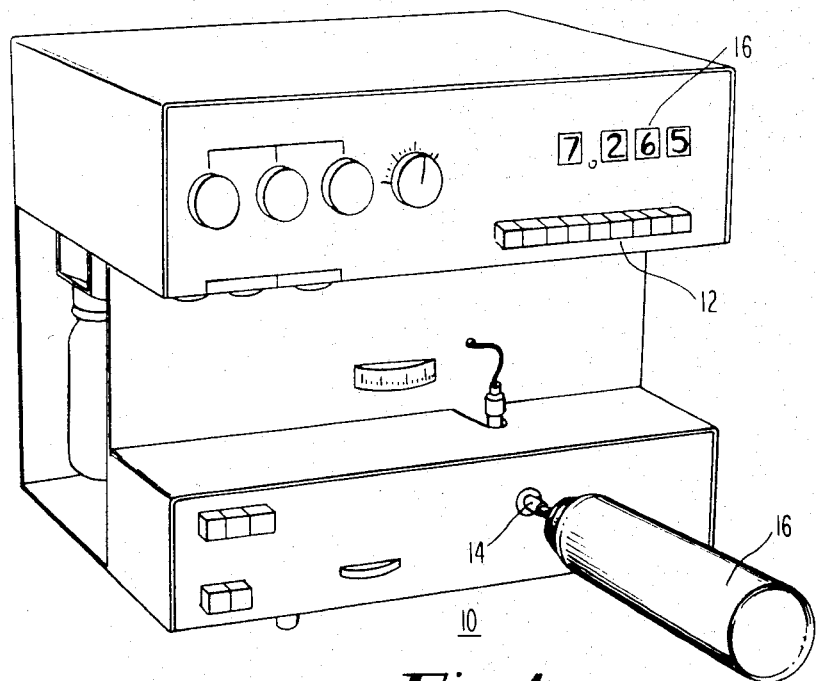
FIG. 1 is a perspective view of a blood gas analyzer into which a quality control reagent is being dispensed from the device of the present invention.

Referring first to FIG. 1, a blood gas analyzer is shown generally at 10. The blood gas analyzer 10 may comprise as an example the Corning Model 165 which comprises a control panel 12 for selecting a particular mode of operation. For example, the analyzer may make a determination of $P_{O_2}$, $P_{CO_2}$ or ph by the proper mode selection at panel 12. An input terminal 14 is provided for the receipt from patients of blood samples which are to be analyzed.

Upon selecting a particular mode of operation, for example a determination of $P_{CO_2}$, a blood sample is introduced from a syringe into input terminal 14 and the partial pressure of the carbon dioxide dissolved in that sample is displayed at output panel 16. However, in accordance with the present invention, blood gas quality control reagent is periodically inserted into the input terminal 14 from a device 16 for storing quality control reagent which will be more fully described in connection with FIG. 2. Alternatively, reagent may be removed from the device 16 into a syringe (not shown) and inserted into the input terminal 14 from that syringe.

Figure 2:
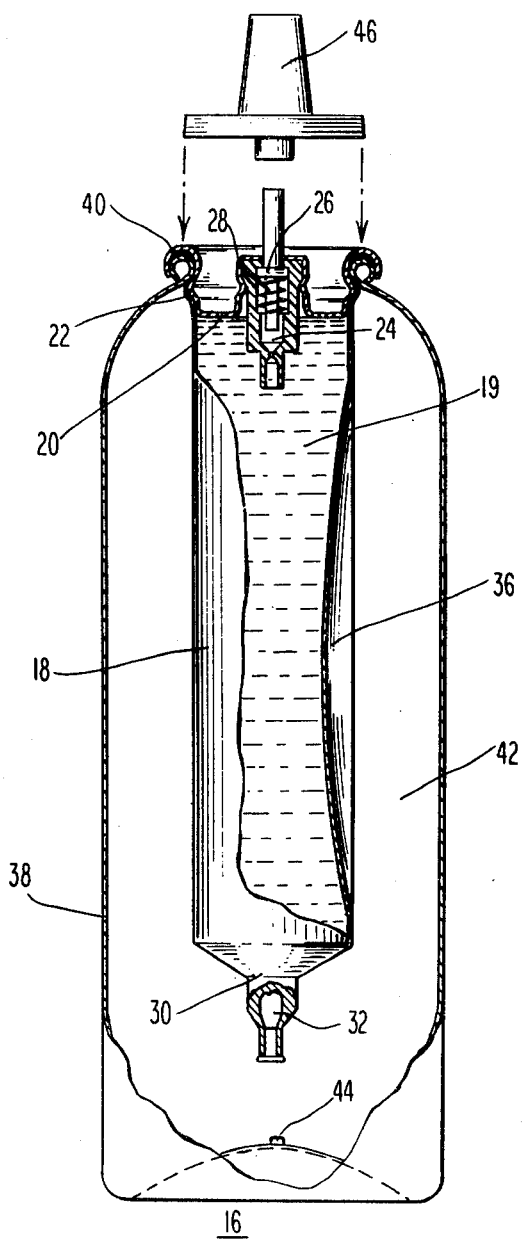
FIG. 2 is a partial cross-sectional view of a device for storing a blood gas quality control reagent according to the present invention.

Referring now to FIG. 2, a device 16 for storing a liquid quality control reagent is described. Device 16 comprises a first container 18. The container is of variable volume and is gas impermeable. Preferably, the container is formed of a metal such as aluminum having an internal coating which is non-reactive with standard blood gas quality control reagents. One exemplary coating of this type would be epoxy. The container 18 is of a relatively light gauge so as to form a collapsible tube. Situated within the container is a quantity of blood gas quality control reagent 19. This quality control reagent 19 may be a buffered bicarbonate solution, for example, such as that disclosed in U.S. Pat. 4,001,142 to Turner. Alternatively, the blood gas quality control reagent could also comprise chemically preserved whole blood. Situated at one end of the first container 18 is an end cap 20 which is sealed to the first container by means of a crimp 22. A sealant may be provided at the crimp 22 to prevent leakage of the reagent. Projecting through the end cap is an exit passageway 24 having a valve 26 or other reusable sealing means situated therein.

The valve 26 is a unidirectional exit valve biased in the closed position by means of a spring 28.

In the preferred embodiment, the end of the first container 18 opposite passageway 24 terminates in a neck region 30 having an input port 32 therein. The input port is sealed by means of a plug 34 which, like the container 18, is gas impermeable and relatively inert such as a glass material or metal. The plug 34 may be covered with a malleable plastic jacket which acts as a gasket, if desired.

In accordance with an important aspect of the present invention, the quality control reagent 19 found in the first container 18 is stored completely in the liquid phase inasmuch as no air space is present within the container. Accordingly, to prevent the first container from rupturing in the event that it is subjected to elevated or freezing temperatures, flutes or indentations 36 are provided therein. These flutes 36 deform outwardly in the event the reagent 19 expands. The first container 18 is surrounded by and situated within a second container 38 except at a collar portion 40 at which the first container 18, second container 38 and end cap 20 are joined. A space 42 is provided between the first container 18 and the second container 38 in which a compressed gas such as air may be found. The compressed gas is preferably introduced through an opening in the bottom of the second container 38 which is closed by a stopper 44. The output end of the exit passageway 24 is preferably provided with a nozzle 46, one embodiment of which will be more fully described in connection with FIG. 3.

Figure 3:
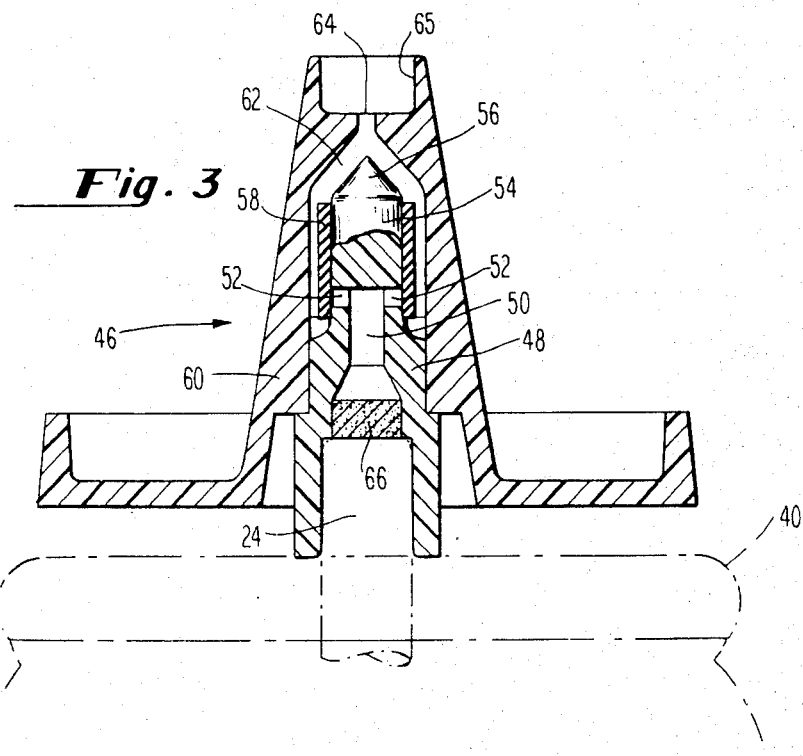
FIG. 3 is cross-sectional view of a nozzle means for use with the device for storing reagent of the present invention.

Referring now to FIG. 3, the nozzle 46 includes a sleeve 48 which surrounds and mates with the exit passageway 24. The sleeve 46 has a central passageway 50 therein from which emanate a plurality of radially projecting openings 52. The sleeve terminates in a cylindrical body 54 having a conical end 56. Surrounding the cylindrical body 54 and the openings 52, a means for preventing return flow of expelled liquid comprising an elastometic tube 58 may be provided. Surrounding the sleeve 48 and the tube 58 is a tapered body 60 which defines an exit chamber 62 between itself and the tube 58 and sleeve 48. The exit chamber 62 communicates with the external environment through an opening 64.

Blood gas reagent passing through exit passageway 24 upon opening of valve 26 passes through central passageway 50 and then is directed radially through openings 52 causing the radial expansion of the tube 58. The fluid then enters the exit chamber 62 from which it passes through opening 64 into a syringe (not shown) for ultimate entry into the input terminal 14. As shown in FIG. 3, the opening 64 is situated in a female type depression 65 for receipt of the tip of a syringe. However, it should be understood that opening 64 could terminate at a male type projection for direct insertion of the reagent to input terminal 14. The tube 58 is provided such that fluid, once removed from the device 16, will not return thereto in order that contamination of the remaining blood gas reagent found in the device 16 will be avoided.

In most blood gas analysis equipment, it is desirable that blood gas reagent exiting from the opening 64 not exceed a rate of about 0.5 cc per second. Accordingly, the passageway 24 may be further provided with a means for limiting the outflow of side reagent such as the porous flow restrictor 66 shown within the central passageway 50 in FIG. 3.

Figure 4:
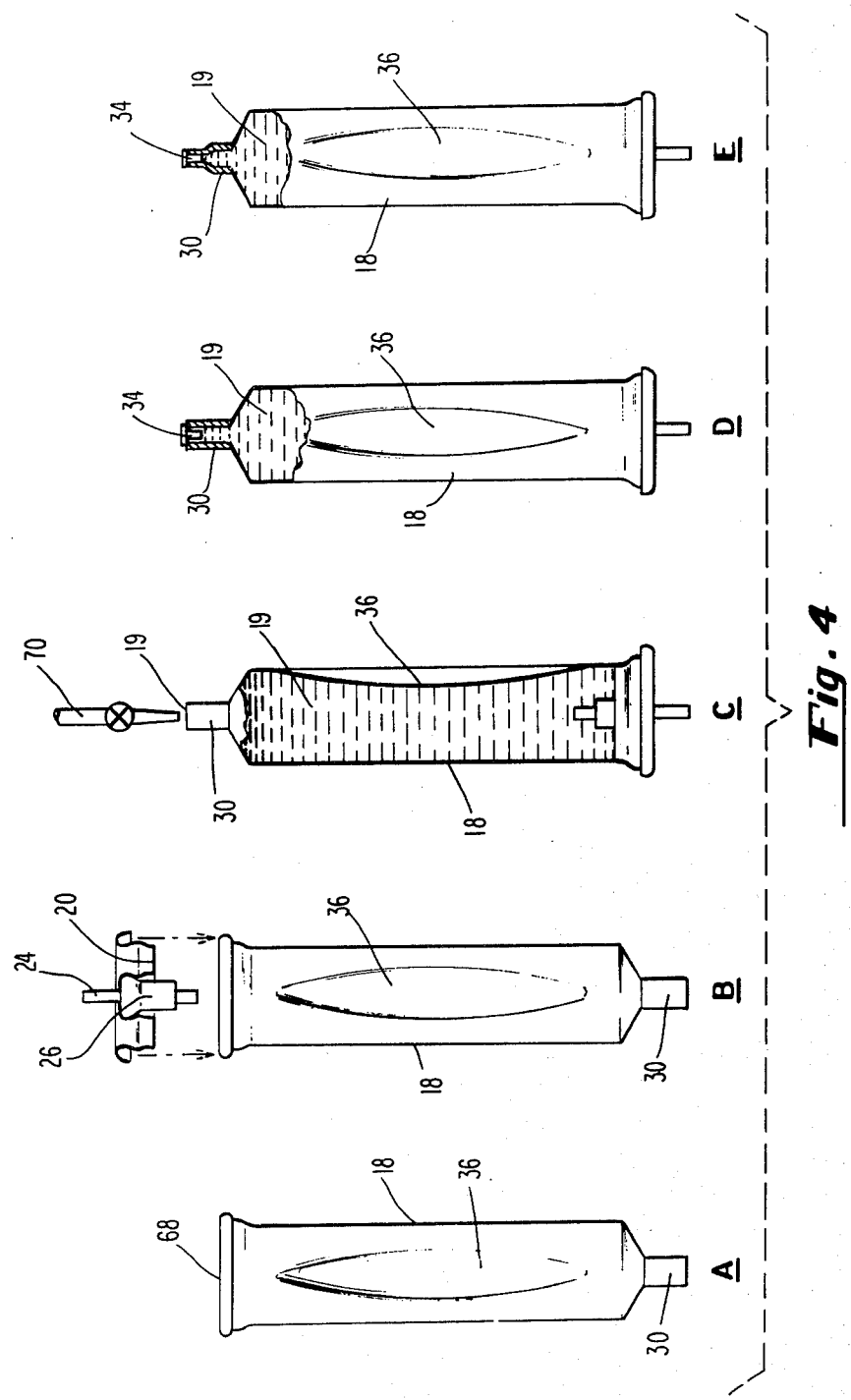
FIGS. 4A–E are a plurality of side elevational views, some in partial section, illustrating a method of storing liquid quality control reagent according to the present invention.

Referring now to FIG. 4A-4E, a method by which the device shown in FIG. 2 is filled with the liquid quality control reagent 19 and a method of storing the liquid quality control reagent solely in the liquid phase will be described. As seen in FIG. 4A, the first container 18 having flutes 36 therein is provided. The container 18 is open at end 68 and also at the neck region 30.

As seen in FIG. 4B, the end cap 20 having exit passageway 24 with valve 26 therein is attached to an upper end 68 of the first container 18. The end cap 20 and first container 18 are sealed together by means of a crimp 22 as shown in FIG. 2.

As seen in FIG. 4C, the first container 18 is inverted and liquid quality control reagent 19 is inserted into the input port 32 found in the neck region 30 of the container 18 from a reagent supply source through line 70. The container is overfilled such that the reagent extends into the input port. As shown in FIG. 4D, the input port is then sealed by means of a plug 34 which projects into the input port 32 at least as far as the liquid level therein, thus leaving no air space within the container.

Next, as shown in FIG. 4E, the walls of the input port 32 are swaged such that they are compressed against plug 34.

Applicant has discovered that it is desirable to employ a plug 34 rather than to merely crimp the neck region 30 upon itself, since the provision of plug 34 prevents rupture of the coating on the interior of the container 18. Rupture of this coating provides localized points at which corrosion occurs, thus contaminating the quality control reagent 19. Additionally, applicant has discovered that the use of an inert, gas impermeable plug, preferably glass, prevents additional contamination of the reagent 19.

Finally, the filled container 18 shown in FIG. 4E is inserted into a surrounding second container 38 such as that shown in FIG. 2 and gas under pressure is provided in the space 42 therebetween.

While the present invention is particularly adapted to the storage of liquid quality control reagent for use in blood gas analyzers, those skilled in the art will realize that the instant device has utility in the storage of other laboratory reagents which might be affected by contact with the ambient such as background reagents for use in liquid chromatography. Accordingly, while particular embodiments of the present invention have been shown and described, various modifications may be made without departing from the principles of the invention. The appended claims are, therefore, intended to cover any such modification within the true spirit and scope of the invention.

What is claimed is:

1. A device for storing blood gas quality control reagents comprising:
   a first container having said blood gas quality control reagent therein, said container having a variable volume and being gas impermeable, said blood gas quality control reagent being exclusively in the liquid phase, said first container having an input port projecting from said first container for entry of said reagent;
   an exit passageway emanating from said first container;
   a valve situated in said passageway;
   a second container surrounding at least a portion of said first container, a space being present therebetween; and
   a compressed gas situated in said space capable of deforming said first container upon the opening of said valve whereby said blood gas quality control reagent is expelled through said passageway.

2. The device of claim 1 wherein said valve is a undirectional exit valve.

3. The device of claim 1 wherein said first container is formed of metal.

4. The device of claim 1 wherein said first container comprises a collapsible tube.

5. The device of claim 4 wherein said tube comprises flutes along the length thereof.

6. The device of claim 1 further comprising a means for limiting the outflow of said reagent when said valve is completely open to a rate of 0.5 cc. per second.

7. The device of claim 1 further comprising a plug for sealing said input port.

8. The device of claim 7 wherein said plug comprises glass.

9. The device of claim 1 wherein said blood gas quality control reagent comprises a buffered bicarbonate solution.

10. The device of claim 1 wherein said blood gas quality control reagent comprises whole blood.

11. the device of claim 1 further comprising a nozzle means including a means for preventing a return flow of said expelled reagent into said first container.

* * * * *